United States Patent
Fu et al.

(10) Patent No.: US 11,293,415 B2
(45) Date of Patent: Apr. 5, 2022

(54) COMPOSITE AXIAL ENERGY CONSUMPTION DEVICE BASED ON PIEZOELECTRICITY AND SHAPE MEMORY ALLOY

(71) Applicant: DALIAN UNIVERSITY OF TECHNOLOGY, Liaoning (CN)

(72) Inventors: Xing Fu, Liaoning (CN); Hongnan Li, Liaoning (CN); Gang Li, Liaoning (CN); Zhiqian Dong, Liaoning (CN); Zhikai Xu, Liaoning (CN); Xingheng Zhang, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 17/297,872

(22) PCT Filed: Jul. 31, 2020

(86) PCT No.: PCT/CN2020/106048
§ 371 (c)(1),
(2) Date: May 27, 2021

(87) PCT Pub. No.: WO2022/011751
PCT Pub. Date: Jan. 20, 2022

(65) Prior Publication Data
US 2022/0074393 A1 Mar. 10, 2022

(30) Foreign Application Priority Data
Jul. 17, 2020 (CN) .......................... 202010694560.7

(51) Int. Cl.
*F03G 7/06* (2006.01)

(52) U.S. Cl.
CPC ....... *F03G 7/06143* (2021.08); *F03G 7/0635* (2021.08); *F03G 7/0641* (2021.08)

(58) Field of Classification Search
CPC ... F03G 7/06143; F03G 7/0641; F03G 7/0635
(Continued)

(56) References Cited

U.S. PATENT DOCUMENTS

| 4,751,821 A | * | 6/1988 | Birchard | .................... A61F 2/58 60/527 |
| 6,170,202 B1 | * | 1/2001 | Davoodi | ............... E04H 9/0237 52/167.1 |

(Continued)

FOREIGN PATENT DOCUMENTS

| CN | 101851963 A | 10/2010 |
| CN | 105113641 A | 12/2015 |

(Continued)

*Primary Examiner* — Shafiq Mian
(74) *Attorney, Agent, or Firm* — Muncy, Geissler, Olds & Lowe, P.C.

(57) ABSTRACT

The present invention belongs to the technical field of structural vibration control, and provides a composite axial energy consumption device based on piezoelectricity and shape memory alloy, comprising a screw, steel pipes, stiffening ribs, steel sheets, bolt-nuts, piezoceramics, screw caps and SMA wire bundles. The mechanical energy of the structure under pressure is converted into the electric energy of the piezoceramics and then the electric energy is converted into heat energy, so that energy consumption efficiency is high and mechanical performance is good. The SMA wire bundles have large tensile bearing capacity, shape memory effect and good corrosion resistance and fatigue resistance. The number of the segments and the specifications of the piezoceramics and the SMA wire bundles can be adjusted according to the actual needs, so that the structure can be adjusted according to the size of an axial force and specific stress conditions.

5 Claims, 1 Drawing Sheet

(58) Field of Classification Search
USPC .................................................. 60/526–528
See application file for complete search history.

(56) References Cited

U.S. PATENT DOCUMENTS

| | | | | |
|---|---|---|---|---|
| 2006/0225977 A1* | 10/2006 | Melz | ..................... | F16F 15/007 |
| | | | | 188/266.7 |
| 2012/0198835 A1 | 8/2012 | Skurkis et al. | | |
| 2013/0298549 A1* | 11/2013 | Manriquez, Jr. | .......... | F03G 7/06 |
| | | | | 60/528 |

FOREIGN PATENT DOCUMENTS

| | | |
|---|---|---|
| CN | 206090914 U | 4/2017 |
| CN | 206971866 U | 2/2018 |
| CN | 110241940 A | 9/2019 |
| CN | 111021569 A | 4/2020 |
| CN | 212271761 U | 1/2021 |

\* cited by examiner

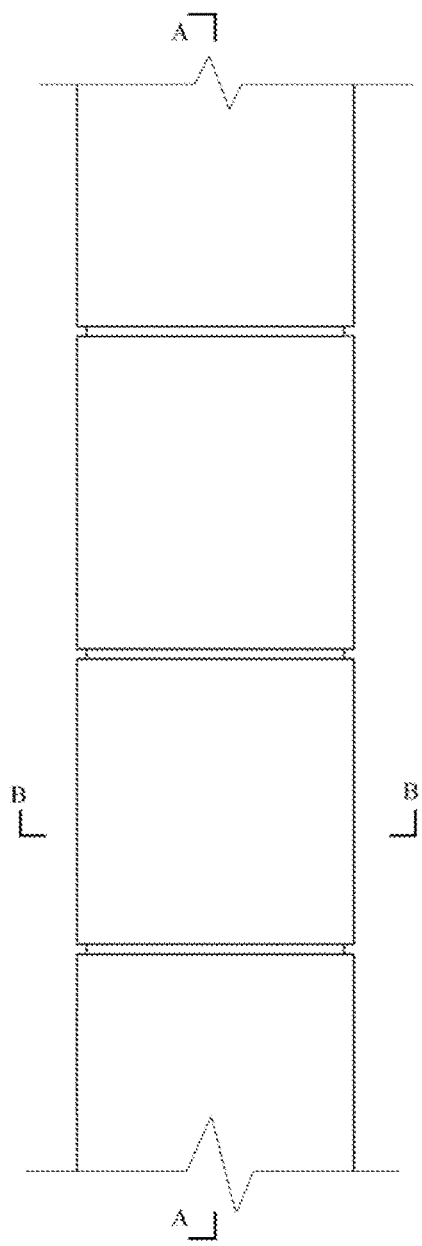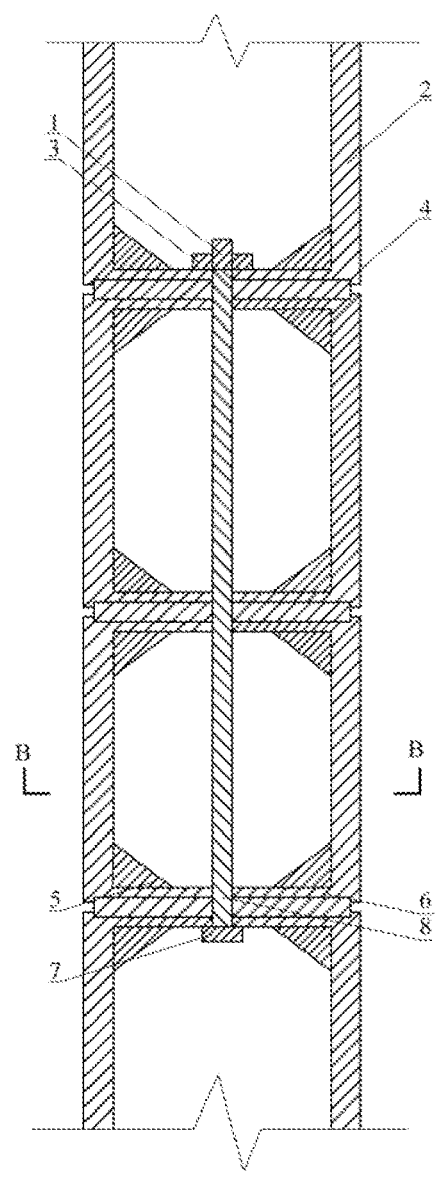
Fig. 1 Fig. 2
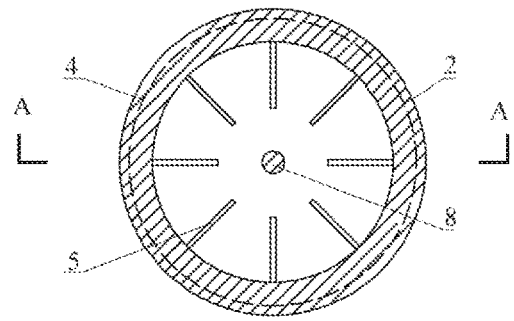
Fig. 3

COMPOSITE AXIAL ENERGY CONSUMPTION DEVICE BASED ON PIEZOELECTRICITY AND SHAPE MEMORY ALLOY

TECHNICAL FIELD

The present invention belongs to the technical field of structural vibration control, and relates to a composite axial energy consumption device based on piezoelectricity and shape memory alloy.

BACKGROUND

In recent years, with the continuous increase of steel production in China, the tube truss has been used more widely and the proportion of the tube truss in the construction becomes larger. The cross section materials of the tube truss structure are uniformly distributed around a neutralizing shaft, so that the cross section has the characteristics of good compressive property and large torsional rigidity. In addition, the tube truss structure has good overall performance, simple structure, beautiful appearance and easy manufacturing, installation, turnover and hoisting.

At present, many steel truss members are easy to cause fatigue cracks and defects under long-term dynamic cyclic loading, thereby generating structural defects such as reduced structural bearing capacity and durability and failing to meet the requirements of normal use of people.

The present invention creatively proposes a composite axial energy cosumption device based on piezoelectricity and shape memory alloy. The axial pressure on a steel pipe is converted into electric energy by using a piezoelectric effect principle and the electric energy is converted into heat energy for consumption by using a resistance wire, thereby greatly increasing energy consumption efficiency. Shape memory alloy (SMA) wire bundles are used to bear tension to realize the advantages of large allowable deformation and recoverable deformation. Under the combined action with a piezoelectric energy consumption device, the energy of the structure under dynamic loading can be effectively consumed, thereby reducing structural dynamic response and improving the service life.

SUMMARY

The purpose of the present invention is to design a truss connecting device with reasonable structure and obvious energy consumption effect.

The technical solution of the present invention is as follows:

A composite axial energy consumption device based on piezoelectricity and shape memory alloy is mainly composed of a screw, steel pipes, bolt-nuts, piezoceramics, stiffening ribs, steel sheets, screw caps and SMA wire bundles.

The whole composite axial energy consumption device is provided with a plurality of segments; each segment is mainly composed of the steel pipe, the steel sheet and the piezoceramics; and all the segments are connected in series by the SMA wire bundles.

The steel sheets are in rigid connection with the steel pipes; and the piezoceramics between the segments are in close contact with the upper steel sheet and the lower steel sheet and are fixed by clamping buckles formed by the steel sheets and the end parts of the steel pipes.

The stiffening ribs are arranged between the steel pipes and the steel sheets; and holes are reserved at the centers of the steel sheets and the piezoceramics.

The upper ends of the SMA wire bundles are in rigid connection with the screw, and the lower ends are in rigid connection with the screw caps; and the SMA wire bundles pass through the holes reserved at the centers of the steel sheets on the segments and the piezoceramics in sequence.

The bolt-nuts and the screw are tightened, and the SMA wire bundles are fixed and applied with preloads.

The holes reserved in the steel sheets on the segments can pass through the SMA wire bundles to limit the transverse displacement of the SMA wire bundles.

The number of the segments is regulated according to the size of an axial force and specific stress conditions.

Eight symmetrical stiffening ribs are used in a single segment to make the structure more stable.

The present invention has the following beneficial effects:

(1) In the composite axial energy consumption device based on piezoelectricity and shape memory alloy of the present invention, the mechanical energy of the structure under pressure is converted into the electric energy of the piezoceramics and then the electric energy is converted into heat energy, so that energy consumption efficiency is high and mechanical performance is good.

(2) In the composite axial energy consumption device based on piezoelectricity and shape memory alloy of the present invention, the SMA wire bundles with large stress and small strain are used, which can withstand greater tension. The SMA wire bundles have shape memory effect and can realize self-centering.

(3) In the composite axial energy consumption device based on piezoelectricity and shape memory alloy of the present invention, the preloads can be applied to the SMA wire bundles through the bolts, and numerical values are flexible, so that the structural safety is enhanced and the structure is suitable for different stress conditions.

(4) In the composite axial energy consumption device based on piezoelectricity and shape memory alloy of the present invention, the number of the segments and the specifications of the piezoceramics and the SMA wire bundles can be adjusted according to the actual needs, so that the structure can be adjusted according to the size of the axial force and the specific stress conditions.

(5) The composite axial energy consumption device based on piezoelectricity and shape memory alloy of the present invention has the advantages of simple structure, easy maintenance and better mechanical performance than ordinary steel pipes.

DESCRIPTION OF DRAWINGS

FIG. 1 is a planar diagram of a composite axial energy consumption device based on piezoelectricity and shape memory alloy provided by embodiments of the present invention;

FIG. 2 is an A-A sectional view of a composite axial energy consumption device based on piezoelectricity and shape memory alloy provided by embodiments of the present invention; and FIG. 3 is a B-B sectional view of a composite axial energy consumption device based on piezoelectricity and shape memory alloy provided by embodiments of the present invention.

In the figures: 1 screw; 2 steel pipe; 3 bolt-nut; 4 piezoceramics; 5 stiffening rib; 6 steel sheet; 7 screw cap; 8 SMA wire bundle.

DETAILED DESCRIPTION

Specific embodiments of the present invention are further described below in combination with the drawings and the technical solution.

An embodiment of a composite axial energy consumption device based on piezoelectricity and shape memory alloy provided by embodiments of the present invention comprises: a screw 1, steel pipes 2, bolt-nuts 3, piezoceramics 4, stiffening ribs 5, steel sheets 6, screw caps 7 and SMA wire bundles 8.

In the present embodiment, the whole device is provided with a plurality of segments; each segment is composed of the steel pipe 2, the steel sheet 6 and the piezoceramics 4; and all the segments are connected in series by the SMA wire bundles 8. When the structure is pressed, the pressure borne by the steel pipes 2 may be transmitted to the steel sheets 6. Eight symmetrical stiffening ribs 5 are arranged to ensure the local stability at the welding place between the steel pipes 2 and the steel sheets 6 and the uniform transmission of a concentrated force. The upper and the lower steel sheets 6 form a clamping buckle that can fix the position of the piezoceramics 4 to prevent the piezoceramics from sliding left and right. By applying the preloads to the SMA wire bundles, the structure has certain bending performance, torsional performance and shearing performance, so that the axial force member can remain as a whole under bending moment, torque and shear force.

The structure is subjected to reciprocating tension and pressure under the dynamic action. When the member is pressed, the steel sheets extrude the piezoceramics and the upper and the lower surfaces of the piezoceramics respectively generate positive and negative charges; and a closed loop is formed by a copper wire connected with positive and negative electrodes to convert electric energy into heat energy and rapidly consume the heat energy. When the member is pulled, the SMA wire bundles are pulled by two adjacent segments. Because the elastic coefficient of the SMA wire bundles is large, the SMA wire bundles generate small deformation under stress and have good self-centering ability when unloading. The SMA material has the advantages of shape memory, hyperelasticity and high damping characteristic, and thus can effectively prevent the structure from being pulled and damaged.

The mechanical energy of the structure under pressure is converted into the electric energy of the piezoceramics and then the electric energy is converted into heat energy, so that energy consumption efficiency is high and mechanical performance is good. The SMA wire bundles with large stress and small strain are used, which can withstand greater tension. The SMA wire bundles have shape memory effect and good corrosion resistance and fatigue resistance. The number of the segments and the specifications of the piezoceramics and the SMA wire bundles can be adjusted according to the actual needs, so that the structure can be adjusted according to the size of the axial force and the specific stress conditions. The device has the advantages of simple structure, easy maintenance and better mechanical performance than ordinary steel pipes.

When the present invention is designed, it should be noted that: firstly, the compressive bearing capacity of piezoceramic sheets shall be higher than the design pressure of the steel pipes or the member to ensure that the piezoceramic sheets can always stably consume energy before the member fails. Secondly, the tensile bearing capacity of the SMA wire bundles shall be higher than the design tension of the steel pipes or the member, and the tensile stiffness shall be approximate to that of the steel pipes or design stiffness to ensure the overall stiffness and stability of the structure. Thirdly, the screw and the screw caps in rigid connection with the SMA wire bundles need sufficient strength and stiffness, and the preload formed by the three shall be large enough to connect the segments to form a whole. Fourthly, eight symmetrical stiffening ribs are arranged to ensure the local stability at the welding place between the steel pipes and the steel sheets and the uniform transmission of the concentrated force. Fifthly, the upper and the lower surfaces of the piezoceramics shall be connected with a plurality of (more than two) copper wires to ensure the reliability and redundancy of the system.

The above embodiments of the present invention are not intended to limit the protection scope of the present invention, and the embodiments of the present invention are not limited thereto. According to the above content of the present invention and in accordance with ordinary technical knowledge and frequently-used means in the art, other various modifications, replacements or alterations made to the above structure of the present invention without departing from the basic technical idea of the present invention shall fall within the protection scope of the present invention.

The invention claimed is:

1. A composite axial energy consumption device based on piezoelectricity and shape memory alloy comprising;
   a screw, steel pipes, bolt-nuts, piezoceramics, stiffening ribs, steel sheets, screw caps and SMA wire bundles, wherein
   the composite axial energy consumption device is provided with a plurality of segments; wherein each of the segments comprises:
   the steel pipe, the steel sheet and the piezoceramics; and all of the segments are connected in series by the SMA wire bundles;
   the steel sheets are in rigid connection with the steel, pipes, and the piezoceramics between each of the segments are in close contact with upper and lower steel sheets and are fixed by clamping buckles formed by the steel sheets and end parts of the steel pipes;
   the stiffening ribs are arranged between the steel pipes and the steel sheets, and holes are made through the centers of the steel sheets and the piezoceramics;
   the SMA wire bundles have upper ends and lower ends, wherein the upper ends of the SMA wire bundles are in rigid connection with the screw, and the lower ends are in rigid connection with the screw caps; and the SMA wire bundles pass through the holes through the centers of the steel sheets on the segments and the piezoceramics in sequence;
   the bolt-nuts and the screw are tightened, and the SMA wire bundles are fixed and applied with preloads.

2. The composite axial energy consumption device based on piezoelectricity and shape memory alloy according to claim 1, wherein the holes in the steel sheets on each of the segments can pass through the SMA wire bundles to limit the transverse displacement of the SMA wire bundles.

3. The composite axial energy consumption device based on piezoelectricity and shape memory alloy according to claim 1, wherein the number of the segments is regulated according to the size of an axial force and specific stress conditions.

4. The composite axial energy consumption device based on piezoelectricity and shape memory alloy according to claim 1, wherein eight symmetrical stiffening ribs are used in a single segment to make the structure more stable.

5. The composite axial energy consumption device based on piezoelectricity and shape memory alloy according to claim 3, wherein eight symmetrical stiffening ribs are used in a single segment to make the structure more stable.

\* \* \* \* \*